(12) United States Patent
Riek et al.

(10) Patent No.: US 7,148,908 B2
(45) Date of Patent: Dec. 12, 2006

(54) METHOD AND APPARATUS FOR GENERATING IMAGE TRANSITIONS

(75) Inventors: Jonathan K. Riek, Webster, NY (US); Alexander C. Loui, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 825 days.

(21) Appl. No.: 09/998,622

(22) Filed: Oct. 31, 2001

(65) Prior Publication Data
US 2003/0080980 A1 May 1, 2003

(51) Int. Cl.
*G06T 15/00* (2006.01)
(52) U.S. Cl. .................. 345/646; 345/619; 345/629; 375/240.12
(58) Field of Classification Search ............. 345/646, 345/619, 629, 418; 375/240.12
See application file for complete search history.

(56) References Cited

U.S. PATENT DOCUMENTS

| 5,559,562 A | 9/1996 | Ferster ............... 348/584 |
| 5,959,690 A | 9/1999 | Toebes, VII et al. ....... 348/578 |
| 5,987,179 A | 11/1999 | Riek et al. ............. 382/236 |
| 6,208,691 B1 | 3/2001 | Balakrishnan et al. . 375/240.12 |
| 2002/0064228 A1* | 5/2002 | Sethuraman et al. ... 375/240.12 |

FOREIGN PATENT DOCUMENTS

EP 0 656 729 A2 11/1994
EP 0 726 679 A1 8/1995

OTHER PUBLICATIONS

Jun et al., Dissolve transition detection algorithm using spatio-temporal distribution of MPEG macro-block types (poster session), Oct. 2000, Proceedings of the eighth ACM international conference on Multimedia, pp. 391-394.*
Puri et al., MPEG-4: an object-based multimedia coding standard supporting mobile applications, Jun. 1998, Mobile Networks and Applications, vol. 3 Issue 1, pp. 5-32.*
Maurizio Pilu, Digital Media Department, (HP Laboratories Bristol, HPL-97-102), Aug. 1997 "On Using Raw MPEG Motion Vectors To Determine Global Camera Motion".*
U.S. Appl. No. 09/885,577, filed Jun. 20, 2001, Alexander C. Loui et al.
XP-002131882—Block Shuffling on Top of Error Concealment for Wireless Image Transmissions, by Kink IP Chan and Justin C-I Chuang, Department of Electrical and Electronic Engineering, Hong Kong University of Science & Technology, pp. 977-981, Apr. 1996.
International Telecommunication Union—ITU-T, Transmission of Non-Telephone Signals, Information Technology—Generic Coding of Moving Pictures and Associated Audio Information: Video, Copyright by the International Telecommunications Union/ITU Telecommunications Standardization Sector, Feb. 4, 1998, pp. 1-201.

* cited by examiner

*Primary Examiner*—Phu K. Nguyen
(74) *Attorney, Agent, or Firm*—David M. Woods

(57) ABSTRACT

A transition in an MPEG sequence including anchor pictures and bidirectionally predicted (B) pictures is encoded by a) coding first and second anchor pictures and b) coding a transition in the sequence by inserting B pictures into the bitstream to create the transition from the first anchor picture to the second anchor picture.

22 Claims, 8 Drawing Sheets

FIRST ANCHOR FRAME

B PICTURE 1

B PICTURE 2

B PICTURE 3

B PICTURE 4

SECOND ANCHOR FRAME

FIG. 1

| FIG. 4A |
|---------|
| FIG. 4B |

FIG. 4

| 0000 0000 0000 0000 0000 0001 0000 0000 | 0000 0000 01 | 01 1 | | |
|---|---|---|---|---|
| PICTURE START CODE | TEMPORAL REFERENCE | PICTURE CODING TYPE | | |
| 000 0101 1101 1101 1 | 1 | 00 1 | 00 1 | 0 |
| VBV DELAY | FULL PEL FWD | FWD FCODE | FULL PEL BKWRD | BKWD FCODE | EXTRA BIT |
| 00 | 0000 0000 0000 0000 0001 0000 0001 | 0000 1 | 0 | |
| PAD | SLICE START CODE | QUANTIZER SCALE | EXTRA BIT SLICE | |
| 1 | 1 | 1 | 1 | |
| 0 10 | BKWD HORIZONTAL FCODE | BKWD VERTICAL FCODE | | |
| MB TYPE | | | | |
| 001 0 | 1 | 1 | | |
| MB TYPE | FWD HORIZONTAL FCODE | FWD VERTICAL FCODE | | |
| 0 10 | 1 | 1 | | |
| MB TYPE | BKWD HORIZONTAL FCODE | BKWD VERTICAL FCODE | | |
| 1 | | | | |
| MBA INCREMENT | | | | |
| 1 | | | | |
| MBA INCREMENT | | | | |
| 0 011 | | | | |
| MBA INCREMENT | | | | |

FIG. 4A

| 1 | 001 0 | 1 | 1 |
|---|---|---|---|
| MBA INCREMENT | MB TYPE | FWD HORIZONTAL FCODE | FWD VERTICAL FCODE |
| 0 011 | 0 10 | 1 | 1 |
| MBA INCREMENT | MB TYPE | BKWD HORIZONTAL FCODE | BKWD VERTICAL FCODE |
| 1 | 001 0 | 1 | 1 |
| MBA INCREMENT | MB TYPE | FWD HORIZONTAL FCODE | FWD VERTICAL FCODE |
| 0 011 | 0 10 | 1 | 1 |
| MBA INCREMENT | MB TYPE | BKWD HORIZONTAL FCODE | BKWD VERTICAL FCODE |
| 1 | 001 0 | 1 | 1 |
| MBA INCREMENT | MB TYPE | FWD HORIZONTAL FCODE | FWD VERTICAL FCODE |
| 0 10 | 00 10 | 1 | 1 |
| MBA INCREMENT | MB TYPE | FWD HORIZONTAL FCODE | FWD VERTICAL FCODE |

FIG. 4B

FIRST ANCHOR FRAME

P PICTURE 1

P PICTURE 2

P PICTURE 3

P PICTURE 4

SECOND ANCHOR FRAME

FIG. 5

METHOD AND APPARATUS FOR GENERATING IMAGE TRANSITIONS

CROSS REFERENCE TO RELATED APPLICATIONS

This invention is related to commonly assigned copending U.S. patent application Ser. No. 09/885,577 entitled "System and Method for Authoring a Multimedia Enabled Disc" and filed Jun. 20, 2001 in the names of A. C. Loui, D. R. Cok and Y. Lo.

FIELD OF THE INVENTION

The invention relates generally to the field of digital image processing, and in particular to transitioning between two sequences or still images using an MPEG compression technique.

BACKGROUND OF THE INVENTION

In the prior art, U.S. Pat. No. 5,987,179, entitled "Method and apparatus for encoding high-fidelity still images in MPEG bitstreams" and issued Nov. 16, 1999 in the names of J. K. Riek et al., describes the coding of still pictures in an MPEG sequence. Furthermore, U.S. Pat. No. 5,959,690, entitled "Method and apparatus for transitions and other special effects in digital motion video" and issued Sep. 28, 1999 in the names of J. A. Toebes VIII et al., and U.S. Pat. No. 5,559,562, entitled "MPEG editor method and apparatus" and issued Sep. 24, 1996 in the name of W. Ferster, describe the insertion of transitions into MPEG bitstreams.

The patent by Riek et al describes different ways of encoding a still image in a bitstream when the decoding buffer is of a limited size. This is often the case in constrained parameter bitstreams such as those used by Video CD (VCD). The patent by Ferster describes a method for decoding two bitstreams, creating the transition effect, and then re-encoding the sequence. The patent by Toebes et al. describes a method for inserting transitions at the decoder.

The prior art has several limitations. The method described by Riek et al. does not teach how to insert transitions, nor is the method well suited for inserting transitions. The patent by Ferster involves a decoding and re-encoding, which is time consuming and will provide lower image quality. The patent by Toebes et al. describes the insertion of transitions, but it is performed at the decoder rather than at the encoder. That is, the frames are never inserted into the transmitted bitstream. This requires additional hardware at the decoder, which is an additional expense and is not standard-compliant.

What is needed is a method for efficiently inserting transitions into the bitstream with no loss of quality and no decoding required.

SUMMARY OF THE INVENTION

The present invention is directed to overcoming one or more of the problems set forth above. Briefly summarized, according to one aspect of the present invention, a method for encoding a transition in an MPEG bitstream sequence including anchor pictures and bidirectionally predicted (B) pictures comprises the steps of a) coding first and second anchor pictures and b) coding a transition in the sequence by inserting B pictures into the bitstream to create the transition from the first anchor picture to the second anchor picture.

In a further embodiment of the method, a transition in an MPEG bitstream sequence including anchor pictures and predicted (P) pictures is encoded by a) coding a first anchor picture and b) coding a transition by inserting P pictures into the bitstream to create the transition from the first anchor picture to a second anchor picture. In an additional embodiment, a transition in an MPEG bitstream sequence including anchor pictures, bidirectionally predicted (B) and predicted (P) pictures is encoded by a) encoding a first anchor picture and b) encoding a transition by inserting B and P pictures into the bitstream to create the transition from the first anchor picture to a second anchor picture.

The present invention overcomes the limitations of the prior art by providing an efficient method for inserting transitions that does not require any decoding and can be performed at the encoder. The use of only B pictures to provide the transitions allows a transition to be inserted in the MPEG sequence in the same manner for any sequence, regardless of the sequence content. The advantageous features of the current invention are:

No decoding required to insert the transition
No discrete cosine transform (DCT) is required, so the computation of the bitstream is efficient.
Transitions can be precomputed as they are independent of scene content.
Transitions are inserted directly into the bitstream at the encoder, rather than the decoder.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 1 is an example sequence of two anchor pictures and four B pictures used to form a transition from a first anchor picture to a second anchor picture.

FIG. 4 is an example coding of B picture 1 as described in FIG. 1 using MPEG-1.

FIG. 5 is an example sequence of two anchor pictures and four P pictures used to form a transition from the first anchor picture to the second anchor picture.

DETAILED DESCRIPTION OF THE INVENTION

Figure 2:
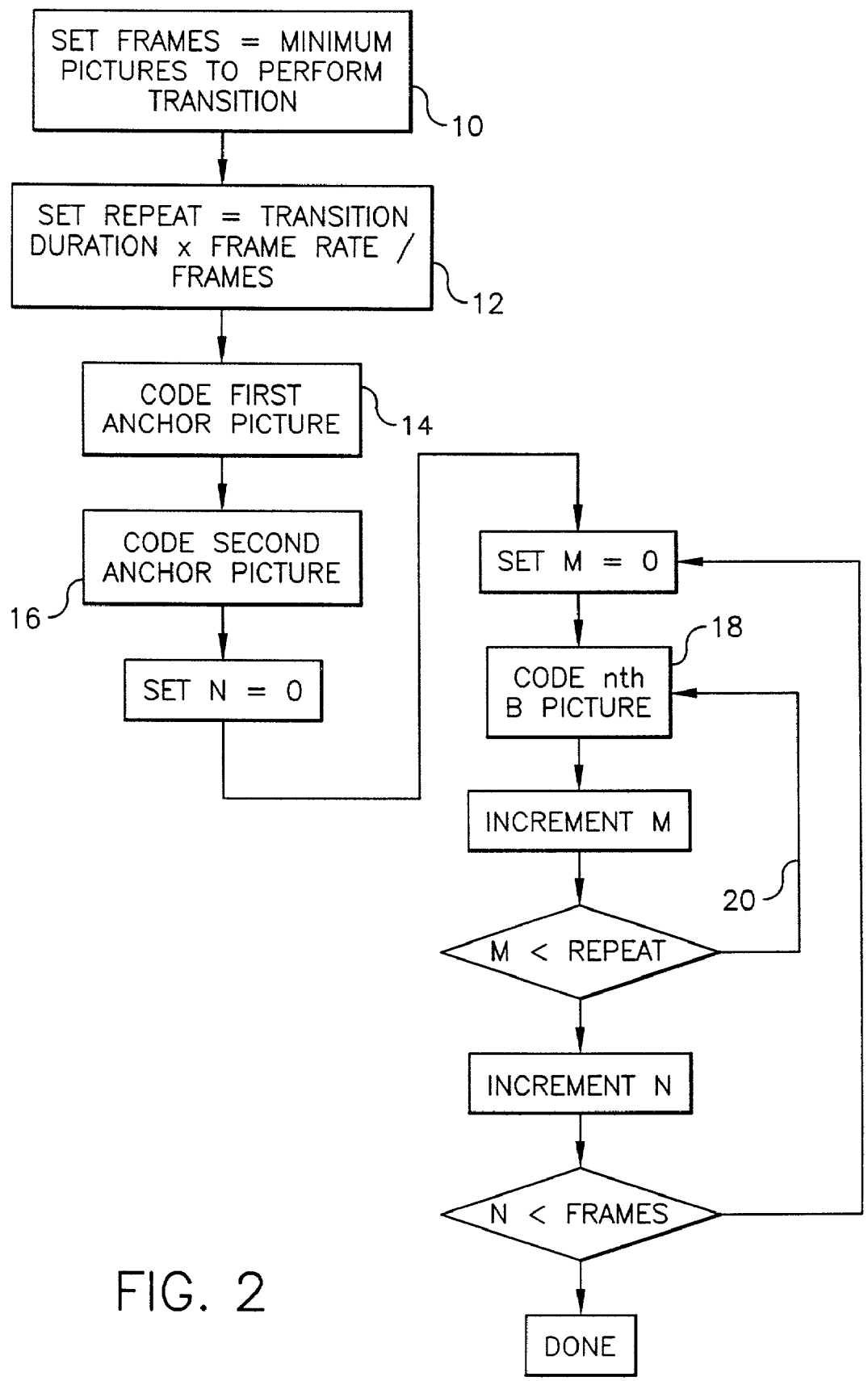
FIG. 2 is a flow chart describing an implementation of the invention using only B pictures to code the transition.

Because image processing systems employing MPEG processing are well known, the present description will be directed in particular to attributes forming part of, or cooperating more directly with, the method in accordance with the present invention. Attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the system as described according to the invention in the following materials, software not specifically shown, suggested or described herein that is useful for implementation of the invention is conventional and within the ordinary skill in such arts. If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

In MPEG, there are three types of pictures: I (intra) pictures, P (predicted) pictures, and B (bidirectionally predicted) pictures. I pictures are coded using only the information in the current image. This is similar to JPEG encoding of a single image. Each picture is divided into 16 pixel×16 line blocks (macroblocks). In P pictures, each 16×16 macroblock may be coded as intra (like an I picture), or as predicted. In a predicted macroblock, a motion vector describes where in the previous anchor picture (I or P picture) to obtain the initial prediction of the current macroblock. The difference between that macroblock and the current is then coded. For a B picture, each macroblock may be coded as in a P picture, or additionally, the macroblock may be predicted from either the next anchor picture or an average of the previous and next anchor pictures.

To obtain a very simple transition from one sequence to the next, we may stop coding the first sequence on an anchor picture (I or P picture). Then the first frame of the second sequence is coded as an anchor picture. Subsequent to the coding of the anchor pictures, a series of B pictures is inserted into the sequence. Each of these B pictures contains macroblocks that are predicted from the same macroblock in either the last anchor frame of the first sequence, or the first anchor frame in the second sequence. Starting with most of the macroblocks being predicted from the first anchor picture in the first inserted B picture, and ending with most of the macroblocks being predicted from the second anchor picture in the last inserted B picture, an uncovering transition effect is created.

For example, to produce a transition that uncovers the second sequence from left to right, a series of B pictures such as those illustrated in FIG. 1 should be inserted into the bitstream. FIG. 1 is an example sequence of two anchor pictures and four B pictures used to form a transition from the first anchor picture to the second anchor picture. Each macroblock is labeled either "1" or "2". The number refers to the content of the macroblock. Macroblocks labeled with a "1" correspond to the content in the same macroblock in the first anchor picture, and macroblocks labeled with a "2" correspond to the content in the same macroblock in the second anchor picture. Macroblocks in the B pictures that are labeled "1" are obtained by coding a forward predicted macroblock with a motion vector of (0,0). Macroblocks in the B pictures that are labeled "2" are obtained by coding a backward predicted macroblock with a motion vector of (0,0). In both cases, no residual is coded. To make this transition last longer, each B picture may be repeated multiple times in the sequence. For example, to make the transition in FIG. 1 last for one second if the sequence is encoded at 30 frames per second, then each B picture should be inserted approximately seven times.

FIG. 2 illustrates the algorithm used to perform the transform shown in FIG. 1. First, the number of frames (n) to perform the transition is calculated in a minimum frame calculation step 10. For example, the minimum number to perform the transition illustrated in FIG. 1 is four not including the anchor pictures. If this transition is to last one second, and the picture rate is 30 frames per second, then the total number of pictures required is 30. The number of times (m) to repeat each picture is 30/4 or approximately 7, as determined in the repeat frame calculation step 12. Once those two constants are determined, we begin by encoding the two anchor pictures in encoding steps 14 and 16. Then, the B pictures are coded in an encoding step 18, where each nth B picture is coded 7 or 8 times in a repetitive flow 20 in the present example.

Different transitions may be created by changing the order in which the macroblocks are changed from being coded as forward predicted to being coded as backward predicted. Flashing effects may be obtained by switching back and forth between forward and backward predicted blocks. Additionally, a fixed pattern picture (such as a constant black picture) may be inserted between the first and second sequences. A transition from the first sequence to this picture may then be inserted, followed by a transition from this picture to the second sequence.

Figure 3:
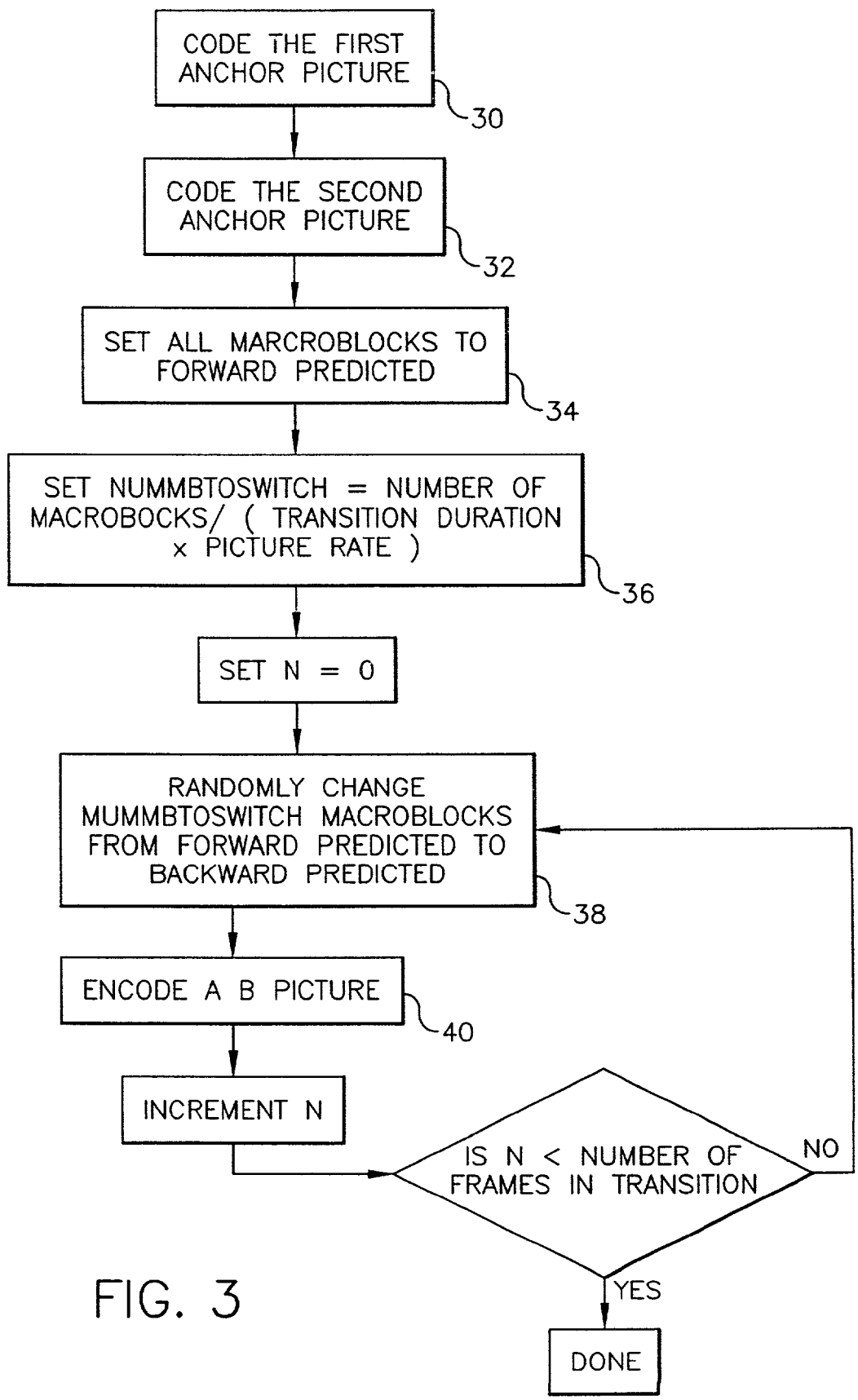
FIG. 3 is a flow chart describing an implementation of a specific random transition using only B pictures.

FIG. 3 illustrates the steps involved in creating a specific transition between two anchor pictures using only B pictures. The process begins by encoding the two anchor pictures in encoding steps 30 and 32. Then all macroblocks are set (step 34) to be forward predicted. The idea is that the macroblocks are randomly switched from being forward predicted to being backward predicted. The number to change each time is determined in a number calculation step 36, where the number to change each time is the total number of macroblocks divided by the number of frames (n) required to encode the transition. For example, in a 352×240 image, there are 330 macroblocks. If the picture rate is 30 pictures per second and we want the transition to last for one second (i.e., n=30), then 11 macroblocks are changed from forward predicted to backward predicted in each picture in the random macroblock change step 38. The B pictures are then coded appropriately to produce the transition in the encoding step 40.

The macroblocks in the B pictures can be coded very efficiently. By determining which macroblocks are coded as forward predicted and which macroblocks are coded as backward predicted, many of the macroblocks can be skipped. In a B picture, a macroblock can be skipped if it is coded in the same manner as the previous macroblock, and no DCT coefficients are coded. Referring to B picture 1 in FIG. 1, the first macroblock (in the upper-left corner) is coded as backward predicted. The next macroblock (in raster-scan order) is coded as forward predicted, and the following three macroblocks are skipped. This means that those three macroblocks are not coded, and the macroblock address increment of the first macroblock in the second row is set to four. FIG. 4 illustrates an example coding of the whole bit stream for B picture 1 in FIG. 1 using MPEG1.

To generate transitions where the image moves across, up or down the screen, the transition cannot be completely coded using only B pictures. The reason for this is that MPEG-1 limits the size of a motion vector to be less than 64. Since a B picture is not an anchor picture, the "sliding" effect cannot be accomplished solely using B pictures. To overcome this limitation, P pictures, which are anchor pictures, need to be inserted into the transition sequence. There are two possible ways to do this. One is to use only P pictures in the transition, and the other is to insert a P picture into the transition every time a macroblock has moved more than a set threshold relative to the previous anchor picture. The P picture only transition will be outlined here, although the B and P picture transition is a simple extension of the P picture only case.

In the P picture only case, the first anchor picture is coded, and then a P picture is coded, rather than the second anchor picture. This P picture consists of forward predicted macroblocks and some intra coded macroblocks. The intra-coded macroblocks are merely copies of the macroblocks in the second anchor picture. For example, consider the transition illustrated in FIG. 5. In the transition, the images slide to the left; the first picture slides off the screen and the second picture slides onto the screen. All the blocks that are shaded are intra coded, whereas all the macroblocks that are not shaded are predicted. In P picture 1, the numerically labeled macroblocks have all shifted 16 pixels to the left. These macroblocks are coded as forward predicted with motion vectors of (16,0). The macroblocks labeled "A", "F", "K", and "P" are intra coded. The actual coding does not need to take place if the second anchor picture was already coded. In this case, the macroblocks can just be copied from the second anchor picture. If the second anchor picture has not yet been coded, then the macroblocks labeled "A", "F", "K", and "P" need to be coded here. The advantage is that the second anchor picture will be replaced with a P picture, so each macroblock is still only intra coded once. The advantage of the P picture only method is that it provides a more constant bitrate. That is, in each frame of the transition, one row or column of macroblocks is intra coded. In the P and B picture method, each P picture will have several rows or columns of P pictures coded, followed by a couple of B pictures that have no intra coded macroblocks. There is no real difference in the total number of bits used to code the transition using either of the two methods, and the resulting pictures displayed on the screen should be identical. So, it may be preferred to use the P picture only method since it does not require any buffering. The duration of the transition may be adjusted by inserting additional P pictures into the transition sequence, in which all macroblocks are forward predicted with motion vectors of (0,0) and no DCT coefficients. These P pictures would be inserted between each of the existing P pictures in the transition sequence.

Figure 6:
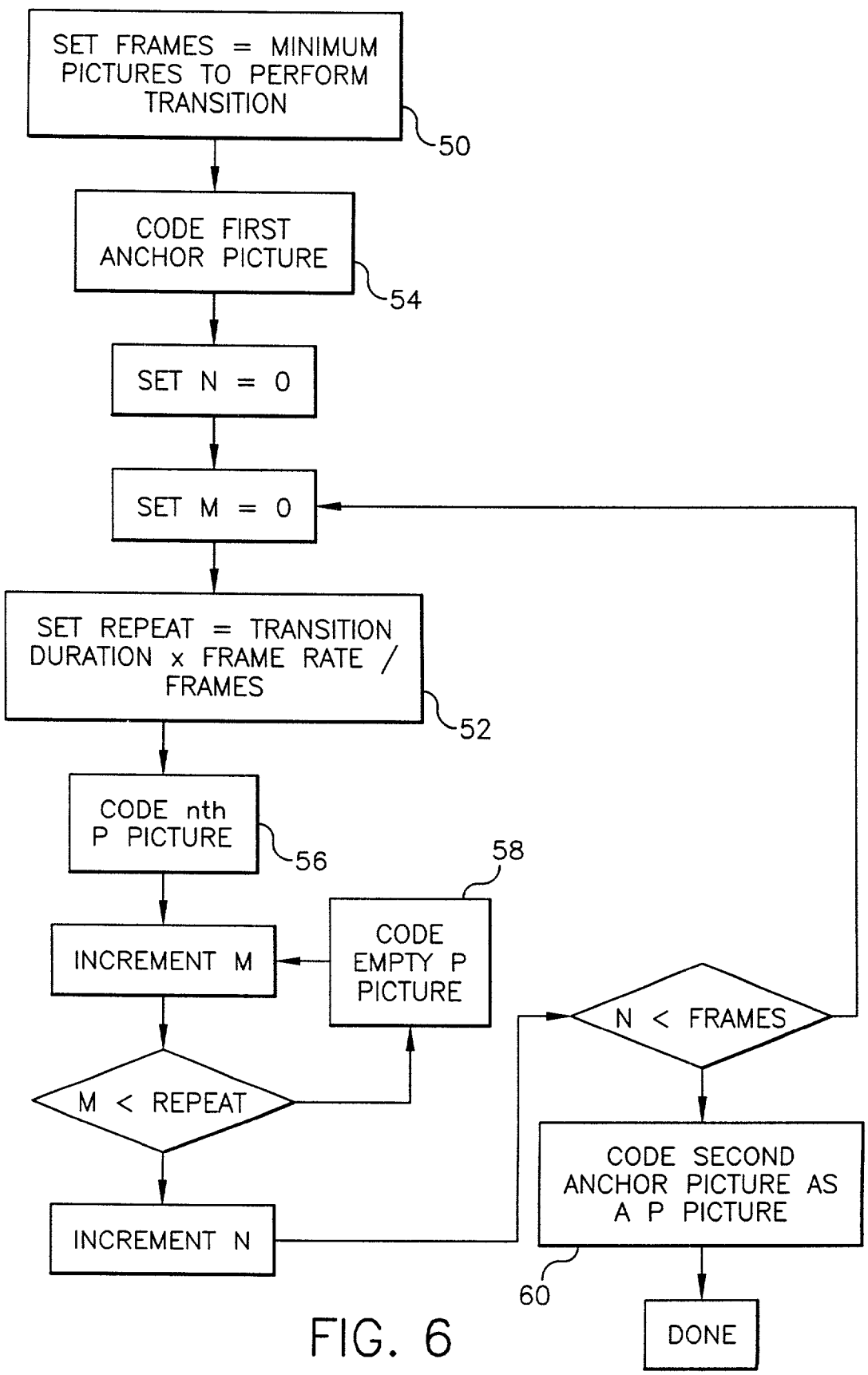
FIG. 6 is a flow chart describing an implementation of the invention using only P pictures to code the transition.

FIG. 6 illustrates a method for implementing the kind of transition shown in FIG. 5. Again, the first thing done is to calculate the number of frames (n) required in a minimum frame calculation step 50 and the number of times (m) they are to repeat in a repeat frame calculation step 52. Next, the first anchor picture is encoded in an encoding step 54. Then, the first P picture from the transition is encoded in a P encoding step 56, followed by a number of "empty" P pictures encoded in an empty frame encoding step 58. The "empty" P pictures are P pictures where every block is forward predicted with (0,0) motion vectors and no residual DCT coefficients. Each P picture in the transition is thus coded along with the appropriate number of "empty" P pictures. The final anchor picture is replaced in a replacement encoding step 60 with a P picture, with the majority of the macroblocks predicted from the last P picture in the transition.

Figure 7:
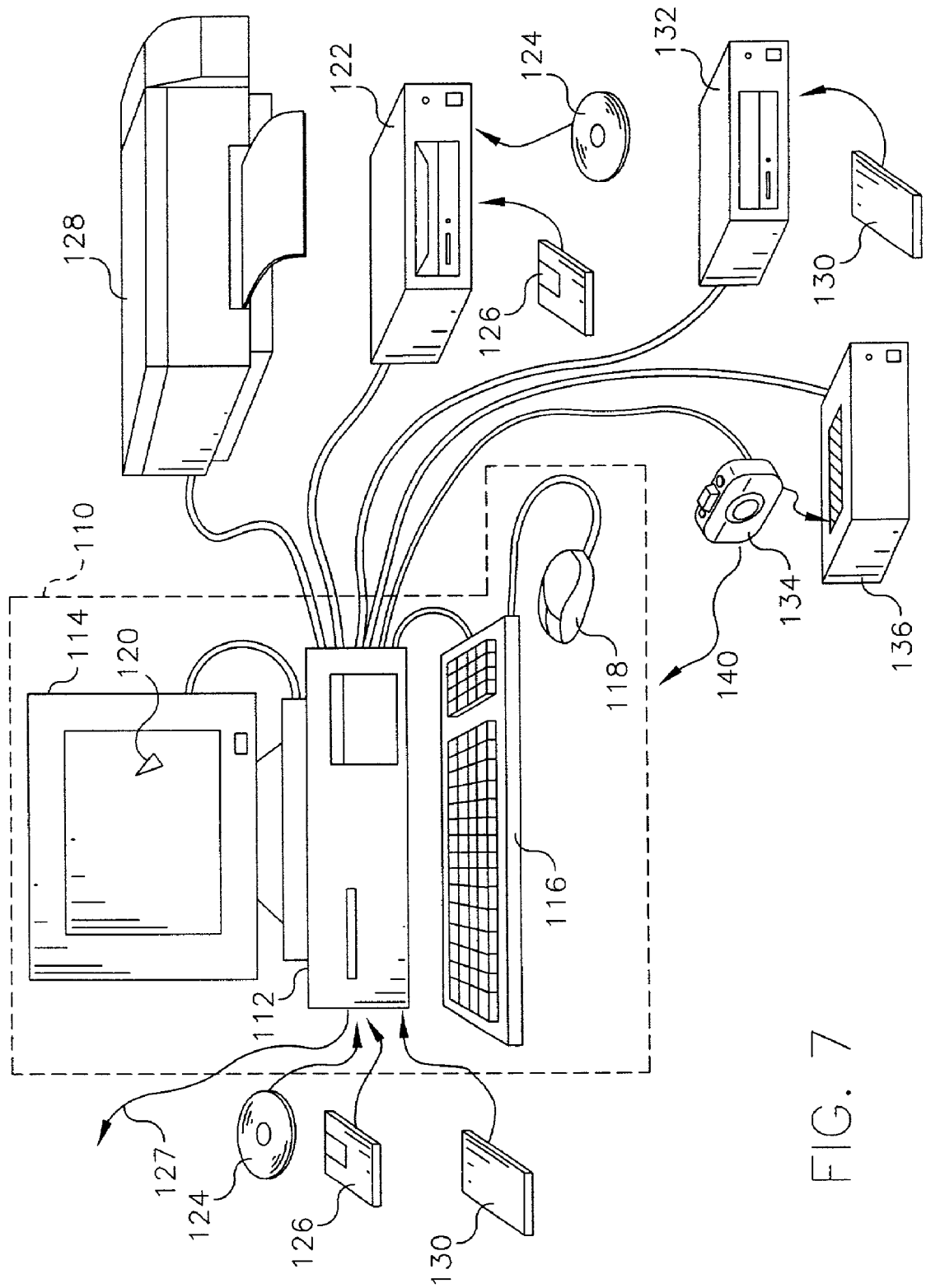
FIG. 7 is a perspective diagram of a computer system for implementing the present invention.

Referring to FIG. 7, there is illustrated a computer system 110 for implementing the present invention. Although the computer system 110 is shown for the purpose of illustrating a preferred embodiment, the present invention is not limited to the computer system 110 shown, but may be used on any electronic processing system such as found in home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 may be used for moving a selector 120 on the display 114 and for selecting an item on which the selector 120 overlays, as is well known in the art.

A compact disk-read only memory (CD-ROM) 122 is connected to the microprocessor based unit 112 for receiving software programs and for providing a means of inputting the software programs and other information to the microprocessor based unit 112 via a compact disk 124, which typically includes a software program. In addition, a floppy disk 126 may also include a software program, and is inserted into the microprocessor-based unit 112 for inputting the software program. Still further, the microprocessor-based unit 112 may be programmed, as is well known in the art, for storing the software program internally. The microprocessor-based unit 112 may also have a network connection 127, such as a telephone line, to an external network, such as a local area network or the Internet. A printer 128 is connected to the microprocessor-based unit 112 for printing a hardcopy of the output of the computer system 110.

Images may also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of the image on the display 114. Images may also be input via the compact disk 124, the floppy disk 126, or the network connection 127. Any images stored in the PC card 130, the floppy disk 126 or the compact disk 124, or input through the network connection 127, may have been obtained from a variety of sources, such as a digital camera 134 or a scanner 136 (for example, by scanning an original, such as a silver halide film). The digital camera 134 may also download images to the computer system through a communications link 140 (e.g., an RF or IR link). In accordance with the invention, the algorithm described herein may be stored as software in any of the storage devices heretofore mentioned and applied to images in order to encode transitions in MPEG sequences. In addition, the CD-ROM 122 may include a write capability and the MPEG sequences with encoded transitions, that are produced by practice of the present invention, may be written to compact disk 124.

In summary, this invention provides a technique for efficiently inserting transitions into an MPEG sequence. Using transitions, rather than sharp scene cuts, can make the sequence more pleasing to view. The present invention is primarily designed for creating transitions in an MPEG coded video sequence of stills. However, it should be understood that the same method could be used to transition between two video motion sequences, and that the claims are intended to cover both situations, that is, either a video sequence of still images or motion images.

The invention has been described in detail with particular reference to certain preferred embodiments thereof, but it will be understood that variations and modifications can be effected within the spirit and scope of the invention.

PARTS LIST 10 minimum frame calculation step
12 repeat frame calculation step
14 first anchor picture encoding step
16 second anchor picture encoding step
18 B picture encoding step
20 repetitive flow
30 first anchor picture encoding step
32 second anchor picture encoding step
34 forward prediction setting step
36 number calculation step
38 random macroblock change step
40 B picture encoding step
50 minimum frame calculation step
52 repeat frame calculation step
54 first anchor picture encoding step
56 P picture encoding step
58 empty P frame encoding step
60 replacement encoding step
110 computer system
112 microprocessor-based unit
114 display
116 keyboard
118 mouse
120 selector
122 CD-ROM
124 compact disk
126 floppy disk
127 network connection
128 printer
130 PC card
132 card reader
134 digital camera
136 scanner
140 communications link

What is claimed is:

1. A method for encoding a transition in a video bitstream sequence including anchor pictures and bidirectionally predicted (B) pictures, said method comprising the steps of:
   a) coding first and second anchor pictures; and
   b) coding a transition in the bitstream by inserting only B pictures into the bitstream to create the transition from the first anchor picture to the second anchor picture.

2. The method as claimed in claim 1 wherein the pictures are comprised of macroblocks and wherein the insertion of the B pictures into the bitstream to create the transition from the first anchor picture to the second anchor picture comprises starting with a B picture in which most of the macroblocks are predicted from the first anchor picture and ending with a B picture in which most of the macroblocks are predicted from the second anchor picture.

3. The method as claimed in claim 1 wherein the pictures are comprised of macroblocks and wherein the insertion of the B pictures into the bitstream to create the transition from the first anchor picture to the second anchor picture comprises switching a number of macroblocks in each of the B pictures from being forward predicted to being backward predicted.

4. The method as claimed in claim 3 wherein the insertion of the B pictures into the bitstream to create the transition from the first anchor picture to the second anchor picture comprises randomly switching a predetermined number of macroblocks in each of the B pictures from being forward predicted to being backward predicted.

5. The method claimed in claim 1, where the first and second anchor pictures in step a) correspond to a last anchor picture in a first video sequence and a first anchor picture in a second video sequence.

6. The method claimed in claim 5, where the video sequences comprise a group of still images.

7. The method claimed in claim 1, where the B pictures in step b) comprise macroblocks that are forward predicted, backward predicted, or interpolated.

8. The method claimed in claim 7, where none of the macroblocks contain DCT coefficients.

9. The method claimed in claim 7, where each of the macroblocks contain motion vectors that are (0,0).

10. A computer storage medium having instructions stored therein for causing a computer to perform the method of claim 1, wherein said method comprises the steps of:
    a) coding first and second anchor pictures; and
    b) coding a transition in the bitstream by inserting only B pictures into the bitstream to create the transition from the first anchor picture to the second anchor picture.

11. A method for encoding a transition in a video bitstream sequence including anchor pictures and predicted (P) pictures, said method comprising the steps of:
    a) coding a first anchor picture; and
    b) coding a transition by inserting only P pictures into the bitstream to create the transition from the first anchor picture to a second anchor picture.

12. The method claimed in claim 11, where the first and second anchor pictures correspond to a last anchor picture in a first video sequence and a first anchor picture in a second video sequence.

13. The method claimed in claim 12, where the video sequences comprise a group of still images.

14. The method claimed in claim 11, wherein the pictures are comprised of macroblocks that are either intra coded or predicted and wherein the second anchor picture is replaced with a P picture with the majority of the macroblocks replaced by macroblocks predicted from the previous P picture in the transition.

15. The method claimed in claim 11, wherein the pictures are comprised of macroblocks that are either intra coded or predicted and where the inserted P pictures comprise macroblocks predicted from either the first anchor picture or a previous inserted P picture and intra coded macroblocks copied from the second anchor picture.

16. The method claimed in claim 11, wherein the pictures are comprised of macroblocks that are either intra coded or predicted and wherein the predicted macroblocks contain motion vectors that are comprised of horizontal and vertical components that are integer multiples of 16.

17. A computer storage medium having instructions stored therein for causing a computer to perform the method of claim 11, wherein said method comprises the steps of:
    a) coding a first anchor picture; and
    b) coding a transition by inserting P pictures into the bitstream to create the transition from the first anchor picture to a second anchor picture.

18. A method for encoding a transition in a video bitstream sequence including anchor pictures, bidirectionally predicted (B) and predicted (P) pictures, said method comprising the steps of:
    a) coding a first anchor picture; and
    b) coding a transition by inserting B and P pictures into the bitstream to create the transition from the first anchor picture to a second anchor picture;

wherein the inserted P pictures comprise macroblocks predicted from either the first anchor picture or a previous inserted P picture and intra coded macroblocks copied from the second anchor picture.

19. The method claimed in claim 18, where the first and second anchor pictures correspond to a last anchor picture in a first video sequence and a first anchor picture in a second video sequence.

20. The method claimed in claim 19, where the video sequences comprise a group of still images.

21. The method claimed in claim 18, wherein the macroblocks of the P pictures that are not intra coded contain motion vectors comprised of horizontal and vertical components that are integer multiples of 16.

22. A method for encoding a transition in a video bitstream sequence including anchor pictures, bidirectionally predicted (B) and predicted (P) pictures, said method comprising the steps of:

a) coding a first anchor picture; and b) coding a transition by inserting B and P pictures into the bitstream to create the transition from the first anchor picture to a second anchor picture;

wherein the inserted B pictures comprise macroblocks that are forward predicted, backward predicted, or interpolated.

\* \* \* \* \*